(12) United States Patent
Human

(10) Patent No.: US 11,855,293 B2
(45) Date of Patent: Dec. 26, 2023

(54) RECHARGEABLE ELECTRICAL STORAGE DEVICES

(71) Applicant: Lukatit Investments 12 (Pty) Ltd, Fourways (ZA)

(72) Inventor: Jan Petrus Human, Krugersdorp (ZA)

(73) Assignee: Lukatit Investments 12 (Pty) Ltd, Fourways (ZA)

( * ) Notice: Subject to any disclaimer, the term of this patent is extended or adjusted under 35 U.S.C. 154(b) by 0 days.

(21) Appl. No.: 17/916,811

(22) PCT Filed: Apr. 5, 2021

(86) PCT No.: PCT/IB2021/052809
§ 371 (c)(1),
(2) Date: Oct. 4, 2022

(87) PCT Pub. No.: WO2021/199010
PCT Pub. Date: Oct. 7, 2021

(65) Prior Publication Data
US 2023/0126499 A1    Apr. 27, 2023

(30) Foreign Application Priority Data
Apr. 4, 2020    (ZA) .................................. 2020/00734

(51) Int. Cl.
*H01M 4/80* (2006.01)
*H01M 4/66* (2006.01)

(52) U.S. Cl.
CPC .............. *H01M 4/80* (2013.01); *H01M 4/661* (2013.01)

(58) Field of Classification Search
CPC .......... H01M 4/661; H01M 4/72; H01M 4/80; H01M 10/06
See application file for complete search history.

(56) References Cited

U.S. PATENT DOCUMENTS

2013/0189602 A1*   7/2013   Lahiri .................... H01G 4/015
977/762

FOREIGN PATENT DOCUMENTS

| EA | 016661 | 6/2012 |
|---|---|---|
| WO | WO 2007/042892 | 4/2007 |
| WO | WO 2019/136467 | 7/2019 |
| WO | WO 2020/047478 | 3/2020 |
| WO | WO 2021/199010 | 10/2021 |

OTHER PUBLICATIONS

International Search Report and the Written Opinion dated Aug. 6, 2021 From the International Searching Authority Re. Appliction No. PCT/IB2021/052809. (6 Pages).

\* cited by examiner

*Primary Examiner* — Stephan J Essex

(57) ABSTRACT

Electrical storage devices (10,38) are provided with pasted negative electrodes (12) and pasted positive electrodes (15) with porous separators (18) between them, with current collectors (20,22) disposed between the separator (18) and the negative and positive pastes (13,16), respectively.

13 Claims, 3 Drawing Sheets

RECHARGEABLE ELECTRICAL STORAGE DEVICES

RELATED APPLICATIONS

This application is a National Phase of PCT Patent Application No. PCT/IB2021/052809 having International filing date of Apr. 5, 2021, which claims the benefit of priority of South Africa Patent Application No. 2020/00734 filed on Apr. 4, 2020. The contents of the above applications are all incorporated by reference as if fully set forth herein in their entirety.

FIELD AND BACKGROUND OF THE INVENTION

This invention relates to rechargeable electrical cells and batteries, including, but not limited to lithium ion, Nickel metal hydride and lead acid batteries.

A secondary cell is an electrochemical cell that can be run as both a galvanic cell and as an electrolytic cell, so that it can be discharged by delivering DC power generated from a chemical reaction and can be charged by supplying DC current, which reverses the chemical reaction. Batteries are collections of cells connected together in series or parallel and are classified by the chemistry on which they rely—the most common being lithium-, lead-, and nickel-based systems, and Li-ion being the battery of choice for portable devices and the electric vehicles. Unless the contrary appears clear from the context, the term "battery" is used herein to refer both to batteries and to cells.

Lead acid batteries comprise a combination of lead plates that are pasted with electrochemically active materials such as lead dioxide and sponge lead and are immersed in a sulfuric acid electrolyte. If these batteries are overcharged, they produce hydrogen and oxygen—which can form an explosive mixture. In addition, the oxygen can rapidly destroy the positive pasted electrodes.

Other batteries include Nickel-Cadmium (NiCad) batteries and the more recently developed lithium ion batteries which are currently the most popular batteries for small electronic devices such as laptop computers mobile phones and cordless tools, and has become increasingly common in these applications. Despite being superior to NiCad batteries in many respects, lithium ion batteries hold disadvantages including: malfunctioning on charge acceptance, dendritic growth, and elevated temperature caused by rapid overcharge—which can lead to thermal runaway. Lithium batteries have earned a reputation for catching fire. The commonly used lithium ion battery formulation had been Lithium-Cobalt-Oxide (LiCoO2), which was prone to thermal runaway in the event of overcharging—which lead to the battery catching alight—and lithium burns rapidly and at high temperature. However, 1996 a new formula for lithium ion batteries was developed with a formulation comprising Lithium-Iron-Phosphate, known as LiFePO4 or LFP. LFP batteries have a slightly lower energy density than Lithium-Cobalt-Oxide batteries, but are intrinsically non-combustible, and thus vastly safer.

One of the challenges that hinder the implementation of cells and batteries, is the need to charge them over extended periods and during these periods, the cells or batteries are unavailable as a source of power.

Attempts have been made to reduce the time required to charge cells or batteries. One approach that has been attempted is an increase in charge current, but this leads to thermal runaway and gas formation—which leads to destruction of the cell or battery. In order to ensure safe operation of a cell or battery and to prolong its useful life, it is essential to prevent excessive heat during charging and to ensure that the temperature remains below the gas formation threshold.

Another approach that has been followed in an attempt to reducing charge times for cells or batteries, is the use of thicker layers of electrochemically active pastes on electrodes or thicker electrodes that result in thicker layers of electrochemically active paste, but this has led to sulphasion and dendritic growth in the paste and the dendrites can damage the separators between electrodes—and thus damage or destroy the cell or battery.

The present invention provides a storage cell or battery and components thereof, which efficiently regulate the charging current through the electrodes and current collectors, and which further allow rapid recharge of the cell or battery.

SUMMARY OF THE INVENTION

According to a first aspect of the present invention there is provided an electrical storage device comprising:
  a first electrode comprising a metal electrode that is pasted with a paste of electrochemically active material which is electrochemically negative;
  a second electrode comprising a metal electrode that is pasted with a paste of electrochemically active material which is electrochemically positive; and
  a porous separator disposed between the first electrode and the second electrode;
  wherein the electrical storage device further comprises:
  a first current collector in the form of a porous conductive layer disposed between the first electrode and the porous separator, the first current collector being in contact with the electrochemically negative paste of the first electrode; and
  a second current collector in the form of a porous conductive layer disposed between the second electrode and the porous separator, the second current collector being in contact with the electrochemically positive paste on the second electrode;
  The term "porous" includes structures with apertures of any size.

Each of the first current collector and the second current collector may comprise of a perforated metal sheet and the term "perforated metal sheet" includes any sheet-like structure with perforations there through—and includes metal grids.

The first current collector and the second current collector may be attached to opposing sides of the porous separator.

The first current collector and the second current collector may be of dissimilar materials.

Each of the first electrode, second electrode, first current collector, and second current collector, may have a tab to which electrical connections can be made.

In an alternative configuration, the first current collector may be attached to a side of the first electrode that faces the porous separator and the second current collector may be attached to a side of the second electrode that faces the porous separator.

The electrical storage device may form a laminate that has been rolled into a cylindrical shape with a separator extending on the outsides of the laminate.

According to another aspect of the present invention there is provided an installation comprising the electrical storage device as described herein above, wherein the first electrode and the second electrode are connected to a first DC power source and the first current collector and the second current collector are connected to a second DC power source.

According to a further aspect of the present invention there is provided an installation comprising the electrical storage device as described herein above, wherein the first electrode and the second electrode are connected to a DC power source and the first current collector and the second current collector are connected to a power consuming electrical circuit. Alternatively, the first electrode and the second electrode may be connected to a power consuming electrical circuit and the first current collector and the second current collector may be connected to a DC power source.

The first electrode and the second electrode, and the first current collector and the second current collector, may be connected to a power consuming electrical circuit.

The invention extends to a cell comprising a plurality of the electrical storage devices described herein above, connected in parallel, wherein the first electrodes of each of the electrical storage devices are connected together, the second electrodes of each of the electrical storage devices are connected together, the first current collectors of each of the electrical storage devices are connected together, and the second current collectors of each of the electrical storage devices are connected together.

The invention also extends to a battery comprising a plurality of the electrical storage devices described herein above, connected in series, wherein the second electrode of a first of the electrical storage devices is connected to the first electrode of a second of the electrical storage devices, and the first current collector of the first of the electrical storage devices is connected to the second current collector of the second of the electrical storage devices.

BRIEF DESCRIPTION OF THE SEVERAL VIEWS OF THE DRAWINGS

For a better understanding of the present invention, and to show how the same may be carried into effect, reference will now be made by way of non-limiting example to the accompanying drawings in which.

DESCRIPTION OF SPECIFIC EMBODIMENTS OF THE INVENTION

Figure 1:
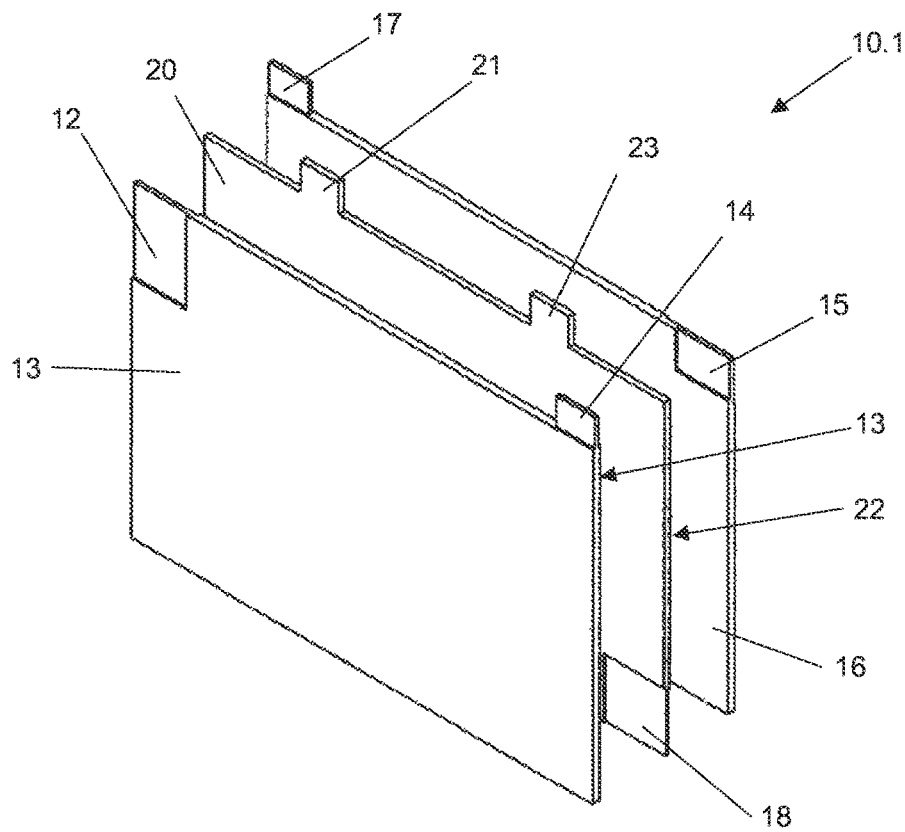
FIG. 1 shows an exploded three-dimensional pictorial view of a first embodiment of an electrical storage cell according to the present invention.
Figure 2:
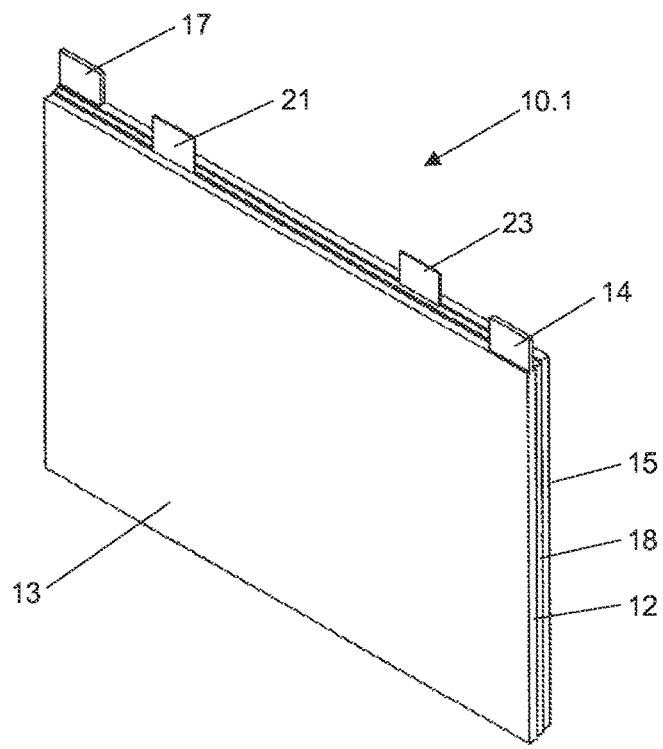
FIG. 2 shows a three-dimensional assembled view of the cell of FIG. 1.
Figure 3:
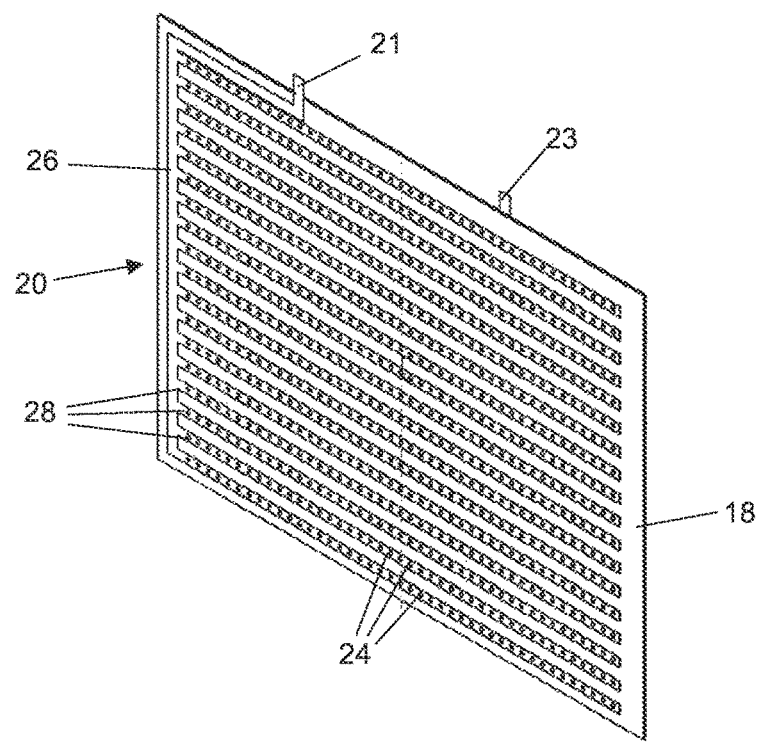
FIG. 3 shows a three-dimensional view of a separator of the cell of FIG. 1, with electrical collectors on each of its sides.

Referring firstly to FIGS. 1 to 3, a first embodiment of a cell according to the present invention is identified generally by reference sign 10.1. The cell 10.1 includes a first electrode 12, a second electrode 15 and a porous separator 18 of an electrically isolating material, extending between the first and second electrodes.

In the embodiment of the invention illustrated in FIGS. 1 and 2, the first and second electrodes 12,15 are conventional lead acid battery plates, each comprising a metal substrate, typically of a lead alloy, and each of the substrates supporting an electrochemically active material that is applied in a paste form and is commonly referred to as "paste" even if it loses its paste-like consistency after application. For the sake of brevity, the term "paste" is used in the detail description of the drawings, to refer to such a electrochemically active materials, the term "positive paste" is used for electrochemically active materials that are electrochemically positive and are suitable for use on positive electrodes, and the term "negative paste" is used for electrochemically active materials that are electrochemically negative and are suitable for use on negative electrodes. By way of non-limiting example, in the case of a lead acid cell 10.1, a suitable positive paste could comprise lead dioxide and a suitable negative paste could comprise sponge lead.

The first electrode 12 serves as a negative electrode and is pasted on both of its opposing sides with negative paste 13. The first or negative electrode 12 has a protruding first tab 14 that extends from its lead alloy substrate and that is thus in conductive contact with the negative paste 13 and serves as a negative tab that can be connected to an external electrical circuit. Likewise, the second electrode 15 serves as a positive electrode and is pasted on both of is opposing sides with positive paste 16. The second or positive electrode 15 has a protruding second tab 17 that extends from its lead alloy substrate and that is thus in conductive contact with the positive paste 16 and serves as a positive tab that can be connected to an external electrical circuit.

The positive and negative electrodes 12,15 and separator 18 are immersed in a suitable electrolyte (such as sulfuric acid) that is contained inside a casing (not shown). The features of the cell 10.1 described thus far are similar to lead-acid batteries of the prior art. In other embodiments of the present invention, the cell 10.1 could be of materials suitable for a different type of chemical reaction, e.g. the first negative and positive electrodes 12,15 could be conventional lithium ion cell electrodes with their respective electrochemically negative paste 13 and electrochemically positive paste 16. Similarly, the cell 10.1 could be of another electrochemical type, such as Nickel metal hydride.

The separator 18 has a first current collector 20 on a side of the separator which faces the first or negative electrode 12. The first current collector 20 is preferably of a metal, which in the illustrated example it is aluminium foil, and the first current collector has a protruding tab 21 that can be connected to an external electrical circuit. On the opposing side of the separator 18, a second current collector 22 is provided and it faces the second or positive electrode 15. The second current collector 22 is also preferably of metal, which in the illustrated example is copper foil, and the second current collector has a protruding tab 23 that can be connected to an external electrical circuit. In other embodiments of the invention, the first and second current collectors may be of the same or different conductive materials.

For illustrative purposes, in FIG. 1, the top left corner of the negative paste 13 is not shown, to reveal the top left corner of the negative electrode 12. Similarly, the bottom right corner of the first current collector 20 is not shown, to reveal the bottom right corner of the separator 18 and the top right corner of the positive paste 16 is not show, to reveal the top right corner of the positive electrode 15. However, for the sake of simplicity, the separator 18 is shown as a solid plate (whereas it has multiple apertures extending through it) and similarly, the first current collector 20 is shown as a continuous plate in FIGS. 1 and 2, whereas its structure is more complex—as described below with reference to FIG. 3.

In other embodiments of the invention, conductive surfaces of the first and second current collectors 20,22 can be pasted with electrochemically active materials.

Referring to FIG. 3, the separator 18 is shown, with the first current collector 20 and its tab 21. The second current collector 22 is identical to the first current collector 21, but is on the opposing side of the separator 18 and in FIG. 3, only the tab 23 of the second current collector is visible. The separator 18 has a plurality of apertures 24, which are in horizontal rows in the illustrated embodiment. The first current collector 20 extends from its tab 21 and extends continuously to form a lateral border 26 along one edge of the separator 18, with horizontal ribs 28 extending from the border across the surface of the separator 18. The horizontal ribs 28 are spaced apart and define apertures that are in register with the apertures 24 of the separator 18. The structures of the separator 18 and first current collector 20 can be varied in other embodiments of the invention, but the current collector should have a substantial outwardly facing surface (formed in the illustrated example by the surfaces of the border 26 and ribs 28) and should not obstruct the apertures 24 of the separator.

When the electrodes 12,15 and separator 18 are assembled the separator is compressed so that the faces of the current collectors 20,22 are in close abutting contact with the pastes 13,16 of the adjacent electrodes, to provide the assembled electrical storage cell as shown in FIG. 2.

In the embodiment of the invention illustrated in FIGS. 1-3, the current collectors 20,22 are supported by the separator 18, but in other embodiments, the current collectors could each be unsupported or could be supported on its adjacent electrode 12,15, with the first current collector 20 on the outside surface of the negative paste 13 and the second current collector 22 on the outside surface of the positive paste 16, respectively. However, the illustrated embodiment, with the current collectors 20,22 supported on the separator 18 allows for convenient assembly of the cell 10.1. Irrespective of the preferred embodiment, there should be good electrical contact between the facing surfaces of the first current collector 20 and the adjacent negative paste 13 and good electrical contact between the facing surfaces of the second current collector 22 and the adjacent positive paste 16.

Figure 4:
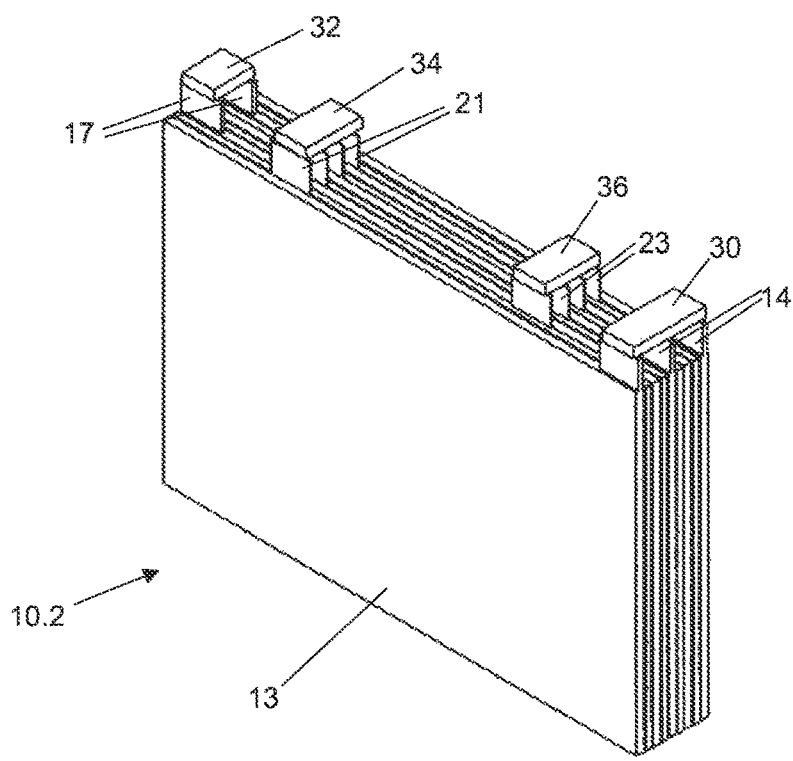
FIG. 4 shows a second embodiment of a cell according to the present invention, comprising multiple electrodes and separators.

Referring to FIG. 4, a second embodiment of a cell according to the present invention is identified generally by reference sign 10.2 and features that are common between the cells shown in FIGS. 1-3 and 4, respectively, are identified by the same reference signs. The cell 10.2 includes three negative electrodes, each of which is identical to the negative electrodes 12 shown in FIGS. 1-3, with its negative paste and its tab 14. Between the negative electrodes, the cell 10.1 includes two positive electrodes that are identical to the positive electrode 15 shown in FIGS. 1-3, each with its positive paste and its tab 17. Between each of the positive and negative electrodes in the cell 10.2, there is a separator 18, each with two current collectors and their tabs 21,23—identical to the separator shown in FIGS. 1-3, wedged in close abutting relationship with its current collectors pressed against the adjacent paste of the adjacent electrodes.

Owing to the thin, plate-like structure of each of the electrodes, separators and current collectors, these elements are not easy to distinguish in FIG. 4, but they are all identical to their counterparts in FIGS. 1-3 and are best identified in FIG. 4 by the positions of their tabs 14,17,21,23.

The tabs 14 of the three negative electrodes in the cell 10.2 are connected by a negative strap 30 of conductive material and the tabs 17 of the two positive electrodes are connected by positive strap 32 of conductive material. Similarly, the four tabs 21 of the first current collectors are connected by a first collector strap and the tabs 23 of the second collectors are connected by a second collector strap 36. Electrical connections can be made to the straps 30,32, 34,36 to charge or discharge the cell 10.2.

Figure 5:
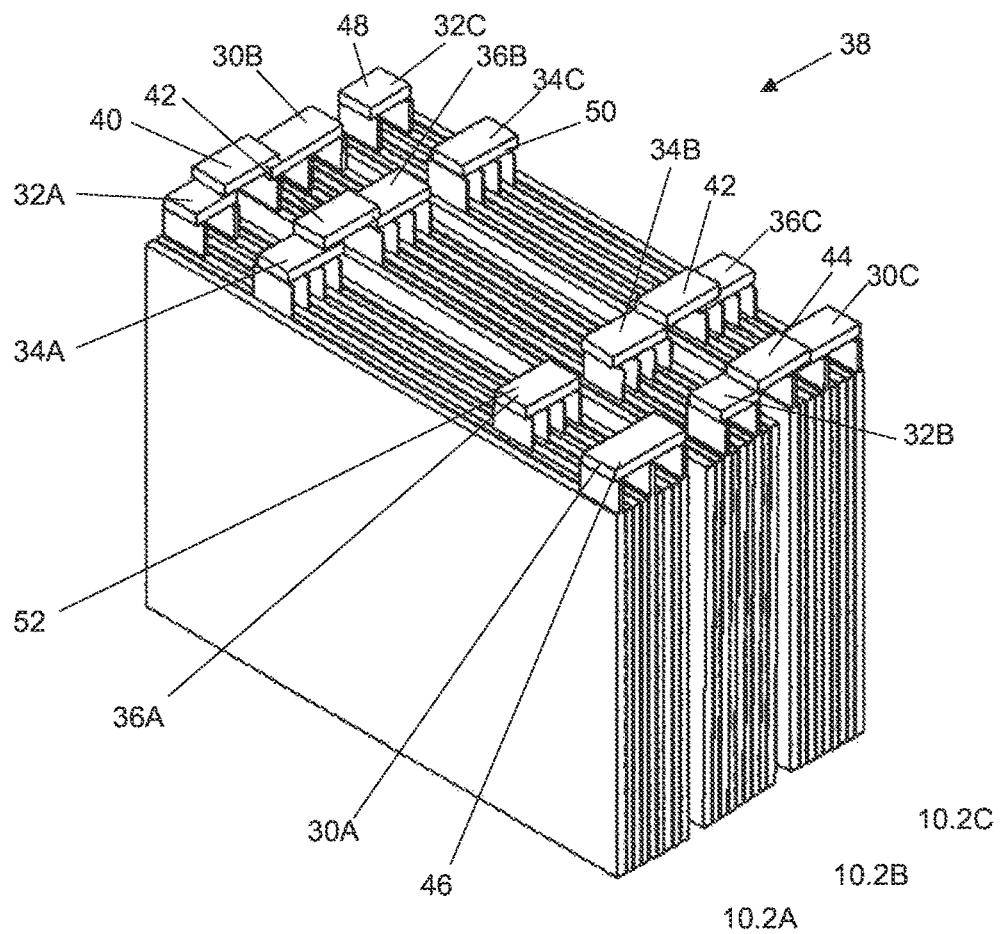
FIG. 5 shows a battery according to the present invention, comprising three of the cells of FIG. 4.

Referring to FIG. 5, one embodiment of a battery 38 according to the present invention is shown, which comprises of three of the cells 10.2 as shown in FIG. 4 and the three cells are distinguished from each other in FIG. 5 by a suffix. The two cells 10.2A and that are on the outsides of the battery 38, have the same orientation as shown in FIG. 4, but the cell 10.2B in the middle has been rotated through 180 degrees. The negative straps 30, positive straps 32, first collector straps 34 and second collector straps 36 of the three cells 10.2A to 10.2C are also identified by the suffices of their respective cells.

The three cells 10.2A, 10.2B and 10.2C are connected in series with bridges to form the battery 38 and the bridges include bridge 40 across positive strap 32A and negative strap 30B, bridge 42 across first collector strap 34A and second collector strap 36B, bridge 42 across first collector strap 34B and second collector strap 36C, and bridge 44 across positive strap 32B and negative strap 30C. The negative strap 30A is not bridged and forms the primary negative terminal 46 of the battery 38. Similarly, the positive strap 32C is not bridged and forms the primary positive terminal 48 of the battery 38. The first collector strap 34C forms the secondary positive terminal 50 and the second collector strap 36A forms the secondary negative terminal 52, of the battery 38.

The cells 10.2A-10.2C are each housed in a separate compartment in a battery casing and are immersed in an electrolyte in its compartment.

The battery 38 can be used in different modes of operation. In a first mode, the power can be drawn from the primary positive and negative terminals 46,48, while the battery 38 is charged by providing power to the secondary positive and negative terminals 50,52. Inversely, in a second mode, power can be drawn from the secondary terminals 50,52, while the battery 38 is charged by providing power to the primary terminals 46,48. In either or both of these modes of operation, charging and discharging of the battery 38 can occur simultaneously and/or intermittently and as a result, the battery can be used where charging power supply and power demand occur at unrelated times.

In another mode of operation, the battery 38 can be charged by supplying current to the primary terminals 46,48 and at the same time supplying current to the secondary terminals 50,52. This mode of operation has the effect of charging the battery 38 far more rapidly than conventional batteries of the same capacity, without overheating, gas formation, or any other effects associated with overcharging.

Another mode of operation of the battery 38 includes drawing power from both the primary terminals 46,48 and the secondary terminals 50,52 at the same time and other modes of operation include drawing power from either the primary terminals or the secondary terminals, or charging the battery by supplying power either to the primary terminals or to the secondary terminals—while the other terminals remain passive.

Figure 6:
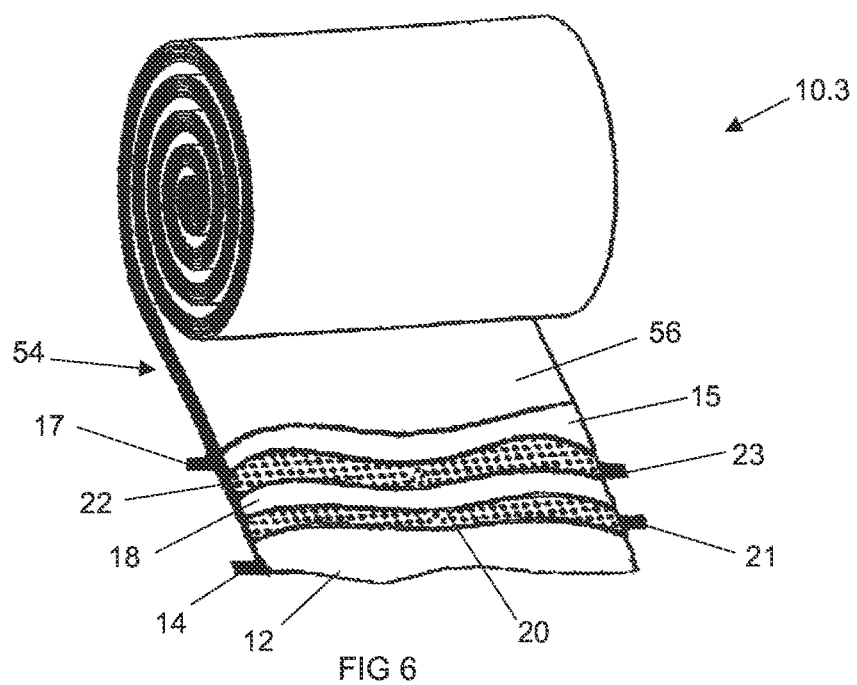
FIG. 6 shows a three-dimensional view of a third embodiment of a cell according to the present invention.

Referring to FIG. 6, a third embodiment of a cell according to the present invention is identified generally by reference sign 10.3 and features that are common between the cells shown in FIGS. 1-3 and 6, respectively, are identified by the same reference signs.

The cell 10.3 is a cylindrical cell and it comprises of the same layers as the cell shown in FIGS. 1-3, except that the layers are not in the form of rectangular plates, but are combined in a laminate 54 and are rolled to provide a cylindrical overall shape and the roll can be inserted into a cylindrical battery casing.

The layers of the laminate 54 as shown in FIG. 6 include (starting from the outside of the laminate) a pasted negative electrode 12 with its tab 14, a first current collector 20 with its tab 21, a porous separator 18, second current collector 22 with its tab 23, pasted positive electrode 15 with its tab 17, and on an inside, another separator 56 to isolate the laminate from the immediately adjacent windings of the same laminate—i.e. to separate the outer face of the pasted negative electrode 12 from the outer surface of the pasted positive electrode 15. The porous separator 18 is shown solid in FIG. 6, but is perforated with multiple apertures. The first and second current collectors 20,22 are shown as perforated layers and their perforations are aligned with the (un-shown) perforations of the separator 18.

Referring to all the drawings, the present invention holds the advantages of substantially reducing the time required to recharge the cell 10 or battery 38 without significant heat generation and extended battery life when compared to conventional batteries. The invention allows increased current flow to the positive and negative pastes 16,13, which reduces dead sport in the pastes—which reduces the likelihood of dendrite growth and sulphation on the outside faces of the pasted electrodes. The current collectors 20,22 on the separators 18 enhance electrolyte density which in turn improves Amp hour capacity per mass of the pastes 13,16. The invention also provides improved control of recharge or discharge currents and reduce the likelihood of thermal runaway during increased electron flow through the cell 10 or battery 38.

The invention can be implemented with relative ease in conventional cells and batteries, because the invention can work with the pasted positive and negative electrodes of conventional batteries, by replacing the conventional separators between adjacent electrodes, with the separator 18 of the present invention, and its first and second current collectors 20,22.

EXPERIMENTAL ASSESSMENTS

Two examples of storage devices according to the present invention were subjected to experiments to establish the recharge times using different connection combinations of their terminals. The experiments were conducted by the South African Bureau of Standard at its laboratory in East London, South Africa in March 2020, at temperatures of 25±5° C. and the equipment used was Computer Controlled Bitrode Test Units and Control Software LCN 25-48 Universal Battery Testers.

ASSESSMENT 1

A single lead acid cell according to the invention was tested. The cell had primary positive and negative electrodes and secondary positive and negative electrodes, but as those skilled in the art would appreciate, if the secondary electrodes were left unconnected and only the primary terminals were used, the cell performed exactly as could be expected with a conventional lead acid cell.

1.1 The cell was first subjected to a capacity test using the following parameters:

Discharge: constant load of 5A applied to the primary terminals; the limit for the end of the discharge voltage was set at 1,75V;

The cell was then fully recharged at a constant current of 5A applied to the primary terminals (cut-off at 2,6V);

1.2 The cell was subjected to a discharge-charge cycle test using the following parameters:

Discharge: constant load of 5A applied to the primary terminals; the limit for the end of discharge voltage was set at 1,75V;

Charge: constant current of 5A applied to the primary terminals to an end of charge voltage of 2,6V;

1.3 The cell was subjected to a discharge-charge cycle using the following parameters:

Discharge: constant load of 5A applied to the primary terminals to an end-point voltage of 1,75V;

Charge: constant current of 5A applied simultaneously, separately to the primary terminals and to the secondary terminals to an end of charge voltage of 2,6V.

Results

| Test | Charge Ah | $t_{2,6V}$ | Discharge Ah | $t_{1,75V}$ | SG, kg/l (after charge) | Temp ° C. |
|---|---|---|---|---|---|---|
| 1.1 | 67.56 | 13h32 | 52.2 | 10h52 | 1.281 | 27 |
| 1.2 | 56.82 | 11h23 | 55.17 | 11h03 | 1.290 | 27 |
| 1.3 | 22.71 (primary terminals) 25.4 (secondary terminals) | 4h33 | 53.78 | 10h47 | 1.294 | 26 |

The discharge performance of the cell was comparable between all three tests and the cell temperature did not deviate markedly from the ambient temperature—from which it can be concluded that the cell operated within safe parameters and was not damaged. However, the time required to charge the cell when power was supplied to the primary and the secondary terminals, was less than half that required when only the primary terminals were used.

ASSESSMENT 2

A Lithium Ion battery pack according to the invention was tested. The battery had primary positive and negative electrodes and secondary positive and negative electrodes, but as those skilled in the art would appreciate, if the secondary electrodes were left unconnected and only the primary terminals were used, the battery performed exactly as could be expected with a conventional Lithium Ion battery.

2.1 With the primary positive terminal and the secondary positive terminals connected together and with the primary negative terminal and the secondary negative terminal connected together, the battery was first subjected to a first discharge and charge cycle and a second discharge and charge cycle.

2.2 The connections between the primary and secondary terminals were removed and only the primary terminals were used (thus emulating a conventional battery) to discharge the battery and charge it.

2.3 With the connections between the primary and secondary terminals removed, the following were conducted:
  a. discharge using only primary terminals; and
  b. charge simultaneously applied separately to the primary terminals and to the secondary terminals using two separate test circuits.

For all the tests in assessment 2, the battery was charged at 1A to an end-point voltage of 4.1V and discharged at 1.5 A to an end-point voltage of 3V.

Results

| Test | Charge | | Discharge | | Temp °C. |
|---|---|---|---|---|---|
| | Ah | $T_{4.1V}$ | Ah | $T_{3.0V}$ | |
| 2.1 | 8,04 | 4h01 | 8, 51 | 5h40 | 24 |
| | 8,64 | 8h38 | 8, 13 | 5h25 | |
| 2.2 | 8,60 | 8h36 | 8, 55 | 5h42 | 25 |
| 2.3 | 4,00 (primary terminals) | 4h00 | 8, 57 | 5h51 | 24 |
| | 4,00 (secondary terminals) | 4h00 | | | |

Again, the discharge performance of the battery was comparable between all tests and the battery temperature did not deviate markedly from the ambient temperature—from which it can be concluded that the battery operated within safe parameters and was not damaged. However, the time required to charge the battery when power was supplied to the primary and the secondary terminals, was less than half that required when only the primary terminals were used.

The invention claimed is:

1. An electrical storage device comprising:
   a first electrode comprising a metal electrode that is pasted with a paste of electrochemically active material which is electrochemically negative;
   a second electrode comprising a metal electrode that is pasted with a paste of electrochemically active material which is electrochemically positive; and
   a porous separator disposed between the first electrode and the second electrode;
   wherein said electrical storage device further comprises:
   a first current collector in the form of a porous conductive layer disposed between the first electrode and the porous separator, said first current collector being in contact with the electrochemically negative paste of the first electrode; and
   a second current collector in the form of a porous conductive layer disposed between the second electrode and the porous separator, said second current collector being in contact with the electrochemically positive paste on the second electrode;
   wherein the first current collector and the second current collector are each in direct contact with the separator;
   the first electrode has a tab that is connectable to a primary negative terminal of the electrical storage device;
   the second electrode has a tab that is connectable to a primary positive terminal of the electrical storage device;
   the first current collector has a tab that is connectable to a secondary positive terminal of the electrical storage device; and
   the second current collector has a tab that is connectable to a secondary negative terminal of the electrical storage device.

2. The electrical storage device according to claim 1, wherein each of said first current collector and said second current collector comprises of a perforated metal sheet.

3. The electrical storage device according to claim 2, wherein said first current collector and said second current collector are attached to opposing sides of the porous separator.

4. The electrical storage device according to claim 2, wherein said first current collector and said second current collector are of dissimilar materials.

5. The electrical storage device according to claim 1, wherein each of said first electrode, second electrode, first current collector, and second current collector, has a tab to which electrical connections can be made.

6. The electrical storage device according to claim 2, wherein said first current collector is attached to a side of the first electrode that faces the porous separator and said second current collector is attached to a side of the second electrode that faces the porous separator.

7. The electrical storage device according to claim 1, which forms a laminate that has been rolled into a cylindrical shape with a separator extending on the outsides of the laminate.

8. An installation comprising the electrical storage device according to claim 1, wherein the first electrode and the second electrode are connected to a first DC power source and the first current collector and the second current collector are connected to a second DC power source.

9. An installation comprising the electrical storage device according to claim 1, wherein the first electrode and the second electrode are connected to a DC power source and the first current collector and the second current collector are connected to a power consuming electrical circuit.

10. An installation comprising the electrical storage device according to claim 1, wherein the first electrode and the second electrode are connected to a power consuming electrical circuit and the first current collector and the second current collector are connected to a DC power source.

11. An installation comprising the electrical storage device according to claim 1, wherein the first electrode and the second electrode, and the first current collector and the second current collector, are connected to a power consuming electrical circuit.

12. A cell comprising a plurality of the electrical storage devices according to claim 1, connected in parallel, wherein the first electrodes of each of the electrical storage devices are connected together, the second electrodes of each of the electrical storage devices are connected together, the first current collectors of each of the electrical storage devices are connected together, and the second current collectors of each of the electrical storage devices are connected together.

13. A battery comprising a plurality of the electrical storage devices according to claim 1 connected in series, wherein the second electrode of a first of said electrical storage devices is connected to the first electrode of a second of said electrical storage devices, and the first current collector of the first of said electrical storage devices is connected to the second current collector of the second of said electrical storage devices.

* * * * *